United States Patent Office 3,650,914

Patented Mar. 21, 1972

3,650,914

METAL PLATING PLASTICS

Kingso C. Lin, Newark, Ohio, assignor to Hooker Chemical Corporation, Niagara Falls, N.Y.

No Drawing. Filed Mar. 3, 1970, Ser. No. 15,917
Int. Cl. C23b *17/00, 5/62;* B44d *1/092*
U.S. Cl. 204—38 B 17 Claims

ABSTRACT OF THE DISCLOSURE

Plastics are metallized by preconditioning the surface thereof by etching and the like, subjecting the preconditioned plastics to an aqueous solution of the organic insoluble product of a process comprising reacting elemental phosphorus an alkali metal or alkaline earth metal alkoxide and oxidizing the resulting product, and thereafter electroless plating the thus-treated plastics.

BACKGROUND OF THE INVENTION

There is a rapidly increasing demand for metal plated articles, for example, in the production of low cost plastic articles that have a simulated metal appearance. Such articles are in demand in such industries as automotive, home appliance, radio and television, and for use in decorative containers and the like. A new process for the metal plating of plastics is described in my copending applications, Ser. No. 750,477, filed Aug. 6, 1968, now abandoned, and Ser. No. 839,080, filed July 3, 1969. That process in part comprises subjecting the plastic to a low oxidation state phosphorus compound in an organic solvent followed by electroless metal plating the substrate to provide an adherently bound layer on the plastic. The low oxidation state phosphorus compounds are in part prepared by reacting elemental phosphorus with an alkali metal or alkaline earth metal alkoxide. When the organic solvent solution of the low oxidation state phosphorus compounds are allowed to stand exposed to the atmosphere or to other oxidizing media, products are formed which are no longer soluble in the organic solvent. It has now been found that these species can be dissolved in an aqueous solvent and employed to metallize plastics.

It is an object of this invention to provide a simple process for the metal plating of plastics. Another object of the invention is to provide a process that is applicable to the plating of many different substrates, particularly the thermoplastic polymers. A further object of the invention is to provide a process whereby the organic-insoluble phosphorus compound can be employed for the metal plating of plastics. A still further object of the invention is to provide articles having an adherent metal coating that is resistant to peeling, temperature cycling, and corrosion.

SUMMARY OF THE INVENTION

This invention relates to a new process for the metal plating of plastics. More particularly, this invention relates to a new process for the metal plating of plastics wherein the plastics are preconditioned by etching and the like and thereafter subjected to an aqueous solution of an oxidized low oxidation state phosphorus compound which is prepared by reacting elemental phosphorus with an alkali metal or alkaline earth metal alkoxide. The resulting treated surfaces can be electroless metal plated and electroplated to provide the metal plated articles. The invention also relates to the metal plated articles produced by the process of this invention.

DESCRIPTION OF THE PREFERRED EMBODIMENTS

Typical plastics to which the process of this invention is applicable include the homopolymers and copolymers of ethylenically unsaturated aliphatic, alicyclic and aromatic hydrocarbons such as polyethylene, polypropylene, polybutene, ethylene-propylene copolymers; copolymers of ethylene or propylene with other olefins, polybutadiene; polymers of butadiene, polyisoprene, both natural and synthetic, polystyrene and polymers of pentene, hexene, heptene, octene, 2-methylpropene, 4-methyl-hexene-1, bicyclo-(2.2.1) - 2 - heptene, pentadiene, hexadiene, 2,3-dimethylbutadiene - 1,3,4 - vinylcyclohexene, cyclopentadiene, methylstyrene, and the like. Other polymers useful in the invention include polyindene, indenecoumarone resins; polymers of perhaloethylenes such as poly(tetrafluoroethylene) and poly(monochlorotrifluoroethylene); polymers of acrylate esters and polymers of methacrylate esters, acrylate and methacrylate resins such as ethyl acrylate, n-butyl methacrylate, isobutyl methacrylate, ethyl methacrylate and methyl methacrylate; alkyd resins; cellulose derivatives such as cellulose acetate, cellulose acetate butyrate, cellulose nitrate, ethyl cellulose, hydroxyethyl cellulose, methyl cellulose and sodium carboxylmethyl cellulose; epoxy resins; furan resins (furfuryl alcohol or furfuralketone); hydrocarbon resins from petroleum; isobutylene resins (polyisobutylene); isocyanate resins (polyurethanes); melamine resins such as malamine - formaldehyde and melamine - urea - formaldehyde; oleo-resins; phenolic resins such as phenol-formaldehyde, phenolic-elastomer, phenolic-epoxy, phenolic-polyamide, and phenolic-vinyl acetals; polyamide polymers, such as polyamides, polyamide-epoxy and particularly long chain synthetic polymeric amides containing recurring carbonamide groups as an integral part of the main polymer chain; polyester resins such as unsaturated polyesters of dibasic acids and dihydroxy compounds, and polyester elastomer and resorcinol resins such as resorcinol-formaldehyde, resorcinol-furfural, resorcinol-phenol-formaldehyde, resorcinol-polyamide and resorcinol-urea; rubbers such as natural rubber, synthetic polyisoprene, reclaimed rubber, chlorinated rubber, polybutadiene, cyclized rubber, butadiene-acrylonitrile rubber, butadiene-styrene rubber, and butyl rubber; neoprene rubber (polychloroprene); polysulfides (Thiokol); terpene resins; urea resins; vinyl resins such as polymers of vinyl acetal, vinyl acetate or vinyl alcohol-acetate copolymer, vinyl alcohol, vinyl chloride, vinyl butyral, vinyl chloride-acetate copolymer, vinyl pyrrolidone and vinylidene chloride copolymer, polyformaldehyde; polyphenylene oxide; polymers of diallyl phthalates and phthalates; polycarbonates of phosgene or thiophosgene and dihydroxy compounds such as bisphenols, thermoplastic polymers of bisphenols and epichlorohydrin (tradenamed Phenoxy polymers); graft copolymers of polymers of unsaturated hydrocarbons and an unsaturated monomer, such as graft copolymers of polybutadiene, styrene and acrylonitrile, commonly called ABS resins; ABS-polyvinyl chloride polymers, recently introduced under the tradename of Cycovin; and acrylic polyvinyl chloride polymers, known by the tradename of Kydex 100.

The polymers of the invention can be used in the unfilled condition, or with fillers such as glass fiber, glass powder, glass beads, asbestos, talc and other mineral fillers, wood flour and other vegetable fillers, carbon in its various forms, dyes, pigments, waxes and the like. If a wax is used as a filler, it has been found that the harder the wax, the more adherent the metal will be bound to the substrate.

The substrates of the invention can be in various physical forms, such as shaped articles, for example, moldings, sheets, rods, and the like; fibers, films and fabrics and the like.

The low oxidation state phosphorus compounds from which the organic insoluble product employed in this invention are obtained are prepared by reacting elemental phosphorus, preferably elemental white phosphorus (which includes various impure or commercial grades sometimes referred to as yellow phosphorus), with an alkali metal or alkaline earth metal alkoxide. The metal alkoxides are alcohols or phenols in which the hydrogen atom of the hydroxyl group has been replaced by the metal. Thus, the term alkoxide encompasses alkylates and phenates. The alkoxides are of the formula $M(OR)_x$ wherein M is an alkali metal (Group 1–A) or an alkaline earth metal (Group II–A), R is alkyl of one to 18 carbon atoms, aryl of 6 to 18 carbon atoms, alicyclic of 5 to 18 carbon atoms, aralkyl of 7 to 18 carbon atoms, and alkylaryl of 7 to 18 carbon atoms, and $x$ is 1 or 2. The R groups can be unsubstituted or substituted with halogen, hydrocarbon groups, nitro groups and the like. Typical alkoxides are lithium methoxide, lithium ethoxide, sodium methoxide, sodium ethoxide, sodium propoxide, potassium methoxide, potassium ethoxide, cesium methoxide, barium methoxide, calcium ethoxide, sodium pentadecanoxide, sodium phenate, potassium phenate, calcium phenate, sodium chlorophenate, potassium chlorophenate, barium chlorophenate, sodium phenyl ethoxide, potassium phenyl ethoxide, magnesium phenyl ethoxide, sodium p-nitrophenoxide, calcium p-nitrophenoxide, sodium beta - naphthoxide, potassium beta-naphthoxide, barium beta-naphthoxide and the like.

The phosphorus is reacted with the alkoxide in a gram atom to gram mole ratio that can vary from 100/1 to 1/100 phosphorus to alkoxide, preferably from 10/1 to 1/10. The reaction is generally conducted below the decomposition point of the alkoxide and below the boiling of the solvent preferably from about −20 to about 200° C. and more preferably at about 0 to about 60 degrees centigrade. The reaction time varies depending on the nature of the alkoxide, solvent and the temperature but is generally in the range of about 1 minute to 24 hours.

The resulting low oxidation state phosphorus compounds are prepared in a solvent. The phosphorus can be reacted with the alkoxide in the solvent. For example, phosphorus can be reacted with sodium ethoxide in the presence of ethanol. Suitable organic solvents or diluents for the low oxidation state phosphorus compounds are solvents or mixtures thereof that dissolve the phosphorus compounds and do not interact with the compounds to rapidly destroy their activity.

Suitable solvents are generally neutral or only weakly acidic. They can be polar or non-polar. Strongly solvanting solvents, either protic or di-polar aprotic are preferred. Solvents that swell a plastic surface or penetrate below the surface without detrimentally affecting the surface are preferable. Typical solvents or diluents can be aliphatic or aromatic and usually contain up to 30 carbon atoms. They include aliphatic and aromatic hydrocarbons, ethers and thioethers; carbonyl compounds such as esters and ketones: nitrogen-containing compounds such as amides, amines, nitriles and nitro compounds; alcohols; phenols; mercaptans; and halogen-containing compounds. Examples of solvents include alcohols such as methanol, ethanol, propanol, butanol, octyl alcohol, decyl alcohol, benzyl alcohol, cyclohexanol, ethylene glycol, glycerol, and the like; aromatic hydrocarbons of 6 to 18 carbon atoms such as benzene, toluene, xylene, ethyl benzene, naphthalene, tetralin, and the like; ethers such as methyl ether, ethyl ether, propyl ether, isopropyl ether, methyl t-butyl ether, 3-methoxy-hexane, anisol, carbitol, diphenyl oxide, and the like; alkanes of 1 to 18 carbon atoms such as methane, ethane, propane, hexane, octane, decane, octadecane, cyclopentane, cyclooctatetraene, and the like; dipropyl sulfide; dibutyl sulfide; dimethyl sulfoxide; tetrahydrothiophene; butyl formate; methyl acetate; ethyl acetate, benzyl acetate; phenyl carbonate; formamide; dimethylformamide; acetamide; N-methyl-2-pyrrolidone; acetone; nitrobenzene; monochlorobenzene; acetophenone; isophorone; tetrahydrofuran; halogenated hydrocarbons and halocarbons such as chloroform, carbontetrachloride, trichloroethylene, trichloroethane, dichloropropane, ethyl dibromide, ethylchlorobromide, and the like; aniline; hexylamine; acetonitrile; benzonitrile; hexamethylphosphoramide; dodecyl mercaptan; phenols such as phenol, resorcinol, catechol, hydroquinone, para-tertiary-butyl phenol, parachlorophenol, para-phenylphenol, cresol thiophenol, mercapto-phenol and the like; and the like organic solvents or diluents. The amount of low oxidation state phosphorus compounds in solution, as measured by the amount of phosphorous therein, varied from about 0.001 weight percent phosphorous based on the total weight of the solution to a saturated solution, preferably from about 0.01 to 0.5% phosphorous.

The organic insoluble species are obtained from the organic solution of the low oxidation state phosphorous compounds by allowing the compounds to become oxidized. This can be accomplished by merely exposing the solution to the atmosphere. If desired, the oxidation step can be accomplished by oxidants other than air such as oxygen, hydrogen peroxide, sodium peroxide, potassium dichromate, potassium permanganate, and the like. There is no minimum or maximum time that the solution is exposed to the oxidative atmosphere because the time factor controls only the amount of insoluble product obtained. Generally, it is convenient to allow the solution to be exposed to the atmosphere for about 30 seconds to about 48 hours or more and most convenient for about 1 hour to about 24 hours.

The organic insoluble product is employed in an aqueous solution. Thus, the solvent can be water or a mixture of water with one or more polar solvents such as methanol, dimethyl formamide, dimethyl sulfoxide and the like. Numerous suitable polar solvents are included in the list of organic solvents disclosed hereinbefore. The amount of organic insoluble product in solution as measured by the amount of phosphorous therein, can vary from about 0.0001 weight percent phosphorus based on the total weight of solution to a saturated solution, preferably from about 0.01 to about 0.5% phosphorus.

While it has not been found necessary to precondition the plastic substrate in the processes of my copending applications, it is necessary to precondition the polymer in employing the aqueous solution of the present process. The preconditioning can be accomplished by any of the methods known in the art such as mechanical or chemical etching, buffing, sand blasting and the like. Preferably, a chemical etching procedure is employed. A suitable etching solution comprises a concentrated solution of chromic acid having a specific gravity in the range of from 1.6 to 1.68. Other suitable etching baths are described in Metallization of Plastic by Harold Narcus, published by Reinhold Publishing Company in 1960.

The synthetic plastic to be plated is first cleaned to insure that soil and other surface contamination due to handling and storage are completely removed. After cleaning, the plastic is rinsed thoroughly and subjected to the etching solution. The concentration of the etching solution and length of etching immersion are chosen such that etching is uniform but not severe enough to degrade the material to be plated. Air or mechanical agitation of the etching solution is helpful in preventing stratification of the constituents of the etching solution and to insure uniform etching. When etched, the object is removed and rinsed thoroughly. Then the etched plastic is immersed in the aqueous solution of the organic insoluble product for a period of time which varies depending on the nature of the plastic, the solvent, and the temperature, but is generally in the range of about 1second to one hour or more, preferably in the range of 1 to 10 minutes. The temperature of the aqueous solution is maintained below the softening point of the plastic and below the boiling point of the aqueous solvent. Generally the temperature is in the range of about 0 to 100° C., but preferably in the range of about 15 to 50° C. The substrate can then be rinsed with a solvent and dried by merely exposing the plastic to the atmosphere or to inert atmosphere such as nitrogen, carbon dioxide and the like, or by drying the surface with radiant heaters or in a conventional oven. Drying times can vary considerably, for example, from 1 second to 30 minutes or more, preferably 5 seconds to ten minutes and more preferably 5 to 120 seconds. The rinsing and drying steps are optional. The treated plastic is thereafter stored before further treatment or can be immediately subjected to electroless plating.

In a typical electroless plating or chemical plating process, a catalytic surface is contacted with a solution of a metal salt under conditions in which the metallic ion of the metal salt is reduced to the metallic state and deposited on the catalytic surface. A suitable chemical treating bath for the deposition of a nickel coating on the catalytic surface produced in accordance with the process of the invention can comprise, for example, a solution of a nickel salt in an aqueous hypophosphite solution. Suitable hypophosphites include the alkali metal hypophosphites such as sodium and potassium hypophosphite, and the alkaline earth metal hypophosphites such as calcium and barium hypophosphite. Suitable metal salts for use in the chemical treating bath include nickel chloride, nickel sulfate, copper sulfate, copper chloride, silver nitrate, nickel cyanide and the like. Other reducing media include formaldehyde, hydroquinone, and hydrozine. Other agents, such as buffering agents, complexing agents, and other additives are included in the chemical plating solutions or baths. Suitable metals, solutions, and conditions for electroless plating are described in Metal Finishing Guidebook Directory for 1967, published by Metals and Plastics Publications, Inc., Westwood, N.J.

The electroless plated plastics of this invention can be electroplated by processes known in the art. The article is generally used as the cathode. The metal desired to be plated is generally dissolved in an aqueous plating bath, although other media can be employed. Generally, a soluble metal anode of the metal to be plated can be employed. In some instances, however, a carbon anode or other inert anode is used. Suitable metals, solutions, and conditions for electroplating are also described in the Metal Finishing Guidebook Directory for 1967.

The following examples serve to further illustrate the invention but are not intended to limit it. Unless specified otherwise, throughout this specification and claims, all temperatures are in degrees centigrade and parts are understood to be in parts by weight.

PREPARATION OF ORGANIC SOLUTIONS

Examples 1–9

Low oxidation state phosphorus compound solutions were prepared by reacting 1 gram-mole of alkoxide in 600 milliliters of solvent with 1 gram-atom of elemental yellow phosphorus. The combinations of alkoxide and solvent were as follows:

| | Alkoxide | Solvent |
|---|---|---|
| Example: | | |
| 1 | Sodium methoxide | Methanol. |
| 2 | Sodium ethoxide | Ethanol. |
| 3 | Lithium ethoxide | Do. |
| 4 | Sodium propoxide | Propanol. |
| 5 | Sodium butoxide | Butanol. |
| 6 | Barium ethoxide | Ethanol. |
| 7 | Calcium methoxide | Methanol. |
| 8 | Sodium phenate | Phenol. |
| 9 | Lithium phenate | Do. |

PREPARATION OF AQUEOUS SOLUTIONS

Example 10

Each of the organic solutions of Examples 1–9 were exposed to the air for 10 hours and the solid precipitate was recovered by filtration and suction dried. Each of the solid residues were dissolved in 200 milliliters of water.

USE OF AQUEOUS SOLUTIONS

Example 11

Samples of a graft copolymer of polybutadiene, acrylonitrile and styrene (ABS) were etched with a solution containing 380 grams of chromic acid and 390 grams of sulfuric acid for 2 minutes. Thereafter each of the etched plastic samples were washed and then immersed in one of the aqueous solutions of Example 10 for 1 minute. Each of the treated ABS samples were allowed to air dry and were thereafter electroless nickel plated for 3 minutes in a solution containing 30 grams nickel chloride, 10 grams sodium hypophosphite, 10 grams sodium citrate, about 1 milligram lead acetate and 1000 grams water and having a pH of 4–6 to provide an adherent electroless conductive coating on the treated plastic.

Example 12

An organic solvent solution of a low oxidation state phosphorus compound was prepared by reacting 7 grams of lithium in 600 milliliters of absolute ethanol and 31 grams of yellow phosphorus. Forty milliliters of the resulting solution was exposed to air for 20 hours and the solid collected therefrom was dissolved in 200 milliliters of water. A one liter etching solution was prepared containing 380 grams of chromic acid and 390 grams of sulfuric acid. ABS molded disks were immersed in the etching solution at room temperature for 2 minutes and then thoroughly rinsed with water. The etched plastic was then dipped into the aqueous solution and air dried in an oven at 85 degrees centigrade for 3 minutes. The thus treated plastic disks were electroless nickel plated as described in Example 11. Some of the resulting electroless plated samples were electroplated with nickel from a Watt's nickel bath and determined to have obtained an adherent metal coating. Other electroless plated disks were electroplated with semibright nickel, bright nickel and then chrome to obtain products that had a bright, glossy, highly light reflecting finish.

Examples 13–20

Following the procedure of Example 12, the following synthetic plastics are plated with metals:

| Example | Substrate |
|---|---|
| 13 | Polyethylene. |
| 14 | Polypropylene. |
| 15 | Polyurethane. |
| 16 | Polycarbonate. |
| 17 | Phenolic resin. |
| 18 | Polyvinyl chloride. |
| 19 | Polystyrene. |
| 20 | Polymethyl methacrylate. |

Example 21

Example 12 is repeated except that the organic solvent insoluble solids are dissolved in a mixture of water and dimethyl formamide.

Various changes and modifications can be made in the process and products of this invention without departing from the spirit and the scope of the invention. The various embodiments described herein serve to further illustrate the invention but are not intended to limit it.

I claim:

1. A process which comprises preconditioning the surface of a synthetic plastic and thereafter subjecting the plastic to an aqueous solvent solution of the organic-insoluble oxidized reaction product of elemental phosphorus and an alkali metal alkoxide or alkaline earth metal alkoxide.

2. The process of claim 1 wherein the aqueous solvent is water.

3. The process of claim 1 wherein the aqueous solvent is a mixture of water and a polar solvent.

4. The process of claim 2 wherein the alkali metal alkoxide is sodium ethoxide.

5. The process of claim 2 wherein the alkali metal alkoxide is lithium ethoxide.

6. A process wherein the treated plastic resulting from the process of claim 1 is electroless metal plated to deposit an electroless conductive coating on the treated plastic.

7. A process wherein the treated plastic resulting from the process of claim 6 is electroplated to deposit an adherent metal coating on the electroless conductive coating.

8. A plastic article having a coating of an organic-insoluble oxidized reaction product of elemental phosphorus and an alkali metal alkoxide or alkaline earth metal alkoxide.

9. The article of claim 8 wherein the alkali metal alkoxide is sodium ethoxide.

10. The article of claim 8 wherein the alkali metal alkoxide is lithium ethoxide.

11. The article of claim 8 having an electroless conductive coating deposited on the coating.

12. The article of claim 11 having an adherent metal coating electrolytically deposited on the electroless conductive coating.

13. An aqueous solvent solution of an organic insoluble oxidized reaction product of elemental phosphorus and an alkali metal alkoxide or alkaline earth metal alkoxide.

14. The solution of claim 13 wherein the aqueous solvent is water.

15. The solution of claim 13 wherein the aqueous solvent is a mixture of water and a polar solvent.

16. The solution of claim 14 wherein the alkali metal alkoxide is sodium ethoxide.

17. The solution of claim 14 wherein the alkali metal alkoxide is lithium ethoxide.

References Cited

UNITED STATES PATENTS

| | | | |
|---|---|---|---|
| 2,943,937 | 7/1960 | Nadeau et al. | 117—47 X |
| 3,067,078 | 12/1962 | Gluck | 161—119 |
| 3,142,581 | 7/1964 | Leland | 117—47 |
| 3,167,491 | 1/1965 | Harrison et al. | 117—47 X |
| 3,370,974 | 2/1968 | Hepfer | 117—47 |
| 3,392,035 | 7/1968 | Torigai et al. | 117—160 X |
| 3,556,956 | 1/1971 | Miller | 204—20 |

JOHN H. MACK, Primary Examiner

R. L. ANDREWS, Assistant Examiner

U.S. Cl. X.R.

204—20; 117—47 R, 71